Oct. 5, 1937.       C. L. BEAL        2,095,119
METHOD OF MAKING RUBBER STRIPS
Filed March 8, 1934
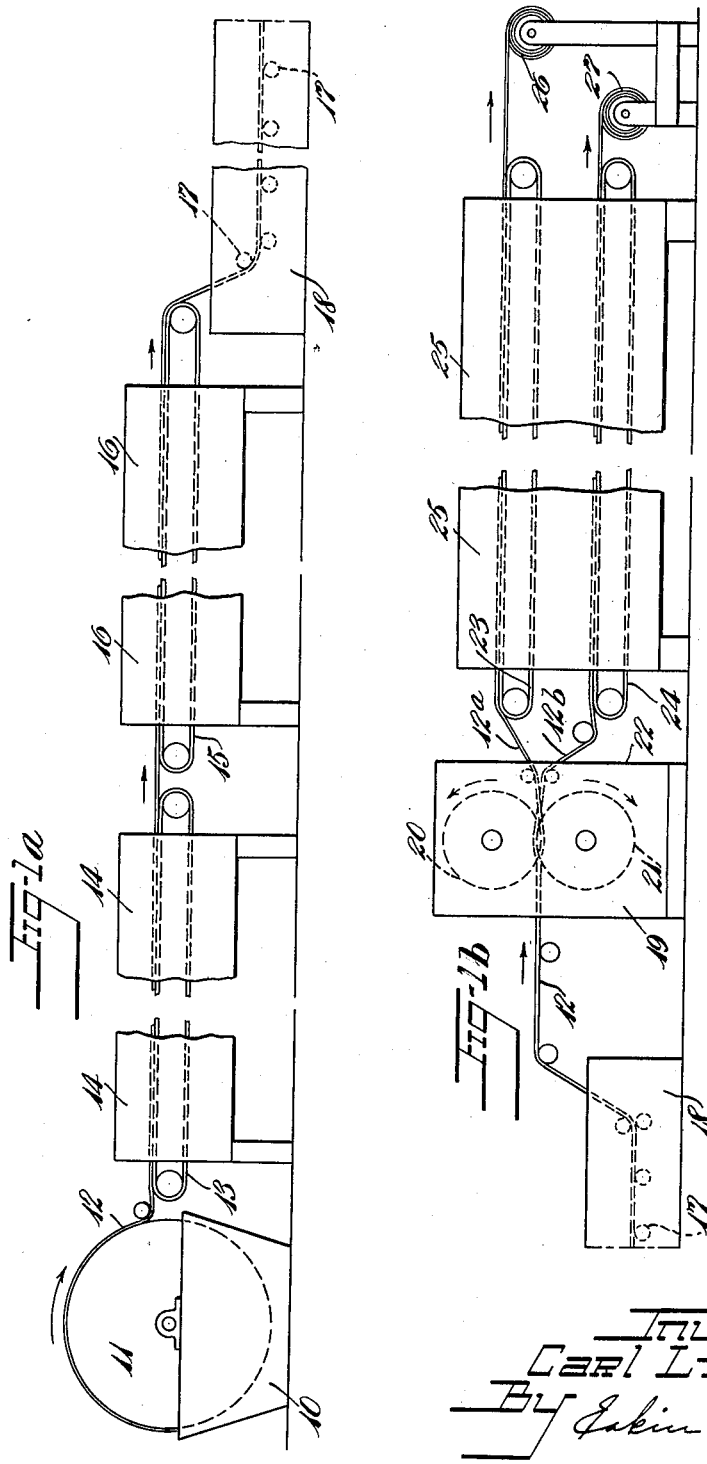

Patented Oct. 5, 1937

2,095,119

UNITED STATES PATENT OFFICE 2,095,119

METHOD OF MAKING RUBBER STRIPS

Carl L. Beal, Cuyahoga Falls, Ohio, assignor to American Anode, Inc., Akron, Ohio, a corporation of Delaware Application March 8, 1934, Serial No. 714,605

9 Claims. (Cl. 18—50)

This invention relates to the manufacture of elastic rubber thread, tape and similar rubber strips which are used for making stretchable fabrics, for winding golf balls, and for other purposes, and is directed especially to a method in which the rubber strips are made by cutting a pre-formed sheet of soft rubber composition into strip form.

A method has been proposed heretofore in which a sheet of rubber is prepared and preferably although not necessarily is vulcanized to the soft rubber state in any suitable manner, and then is passed continuously through a rotary multiple disc cutter or slitter of one of several known types by means of which the sheet is slit progressively along several parallel lines to form a number of rubber strips of widths determined by the usually uniform spacing of the several rotary cutting discs. Threads or strips cut by this method have not always been entirely satisfactory, however, because they frequently exhibit feathered cut edges and the gauge has not been consistently uniform, especially in very fine gauge thread such as that now in great demand for weaving stretchable fabrics. Such defects apparently are traceable to poor cutting caused by high cutting resistance of the rubber sheet which has not been obviated by the use, for example, of improved cutting means such as heated cutters. The unexpected great cutting resistance of the rubber results, it is now believed, at least in part from the progressive setting up of a tough fibrous structure in localized areas of the rubber just in advance of the cutter by the creation of internal stresses produced by rubber deforming forces accompanying the cutting operation. The present invention is in part directed to a method which includes lowering the cutting resistance of the rubber by reducing its ability to assume a fibrous structure when stressed, and thereby to improve the character of the cut obtainable and to improve the quality of the cut thread. A further disadvantage of the above described method is that only a single width thread can be cut with the same set of rotary cutters, which may be said to comprise a cutting roll, so that it is necessary to change the entire cutting roll or rolls or to change the spacing of the cutters upon the roll when it is desired to cut a different width thread. The practical objections to this feature are obvious, and the present invention is further directed to a method which overcomes this inherent disadvantage and makes possible the cutting of a wide range of thread gauges with the same cutting roll or rolls having cutting discs in a fixed spaced relation. The manner in which I secure these and other objects of the present invention will appear from the following description of a method embodying the principles of my discovery.

Briefly stated, the present novel method comprises preparing a sheet of soft rubber composition, preferably although not necessarily vulcanizing the rubber at least to a partial degree, subjecting the rubber sheet to a conditioning treatment designed temporarily to lower the cutting resistance of the rubber by weakening its physical structure and reducing its ability to assume a tough fibrous structure when stressed, which conditioning treatment in a preferred method serves also to swell the sheet a desired amount, then slitting the conditioned sheet longitudinally into a plurality of strips, and finally restoring the cut rubber to its normal physical condition. Thus, it will be seen that I cut the rubber while it is in a physically weakened condition and thereby secure a satisfactory cut edge, and also cut the sheet while it is swollen to an abnormal thickness and width so that the freshly cut strips themselves are abnormally large in cross section but upon being restored to their normal state are much smaller than otherwise could have been cut with the particular set of cutters employed.

The invention as exemplified by a preferred method will be described in greater detail and with reference to the accompanying drawing in which Figs. 1a and 1b illustrate diagrammatically apparatus suitable for carrying out my invention.

In a preferred method, I first form a sheet of unvulcanized soft rubber composition as by depositing solids from compounded liquid rubber latex, contained in a tank 10, upon a rotating deposition drum 11 which is partially immersed in the latex, to produce continuously a sheet of latex rubber 12 which is carried by a belt conveyor 13 through a tunnel dryer 14 heated in any convenient manner to a desired temperature for drying the rubber. The dried rubber sheet then is carried by a second conveyor 15 through a vulcanizer 16 heated in any suitable manner to a temperature adequate to vulcanize the rubber at least partially and preferably completely to an optimum soft rubber cure while it is passing through the vulcanizer. It is obvious that the procedure and apparatus thus far described are well known in the art and that equivalent means for preparing the vulcanized sheet, not only from latex, but from masticated solid rubber as well, may be substituted without departing from the scope of the invention.

As the next step in the preferred process, the rubber sheet is directed by guide rollers 17, 17 through a tank 18 containing a liquid swelling agent, preferably an organic rubber solvent such as solvent naphtha, benzene, gasoline, carbon tetrachloride, etc. The travel of the sheet and the length of the solvent tank are so correlated that the rubber is immersed in the solvent until its structure has been materially weakened and until the sheet has been swollen by the solvent to a desired extent. Thereafter the swollen and weakened sheet is passed through a slitter 19 which may comprise two sets of circular shear discs 20, 21 mounted for rotation upon a supporting frame 22 with the shear discs interlacing slightly to form a multiple disc rotary shear of the type well known in the art. The shearing slitter cuts the sheet longitudinally into several strips and separates the strips into upper and lower sets of alternate strips 12a and 12b which are carried respectively by upper and lower conveyors 23, 24 through a heated dryer and solvent recovery apparatus 25 in which the solvent is evaporated and the rubber of the strips is restored to its normal condition. Finally the finished strips are wound upon suitable reels 26, 27.

It is not possible to give definite instructions relative to the time necessary to treat the rubber with swelling agent in order to secure a desired amount of swelling, for the rate of swelling obviously will vary with different solvents, with variations in temperature conditions, with the thickness of the rubber sheet, with changes in the composition of the rubber itself, and with other like factors. Accordingly, swelling conditions which will produce a thread of a desired gauge must be determined experimentally, but as an indication of the time necessary, it has been found that a well vulcanized soft latex rubber sheet 0.01" thick when immersed in high test gasoline at ordinary room temperatures for 15 minutes will swell about 50% in thickness so that if such a swollen sheet is cut with rotary knives spaced apart a distance corresponding to the thickness of the swollen sheet, the cut swollen thread will be 50% larger in cross section than it will be after removal of the gasoline and restoration to its normal state. A well vulcanized sheet of soft rubber immersed, for example, in high test gasoline swells rapidly at first, but the rate of swelling decreases after fifteen or twenty minutes and appears to reach a practical maximum after about thirty minutes immersion. Further treatment with the solvent does not greatly increase the thickness of the sheet nor does it appear to injure the quality of the rubber. It has been observed that under a fixed set of treating conditions, the swelling rate of similar rubber samples is quite uniform so that the degree of swelling may be controlled and duplicated within close limits to produce threads of uniform gauge from day to day. It is obvious that threads of different gauges may be produced merely by varying the extent to which the sheet is swollen before cutting. It is possible, for example, to use a single cutter with discs spaced normally to cut 100 gauge thread, in the production of thread varying in gauge from 100 to 150 gauge with perfect satisfaction and without affecting the quality of the thread since the solvent treatment appears to have no permanent deleterious effect upon the rubber.

In an alternative embodiment of the invention, I temporarily weaken the prepared soft rubber sheet before cutting by heating it to a temperature sufficiently high to reduce fibering substantially but of course not sufficiently high to injure the sheet or to vulcanize it beyond a desired degree, and cut the rubber while so heated. Thus, it has been found that if a sheet is heated to a temperature of from 50° C. to 100° C., its tendency to fiber and accordingly its cutting resistance is materially and beneficially reduced. With some types of slow vulcanizing stocks which contain substantially no free sulphur or which have been treated to retard vulcanization, higher temperatures may be employed in the conditioning treatment to secure increased cutting efficiency without permanent deleterious effect upon the rubber. It is not desirable, however, to heat the vulcanized rubber until it is actually rendered plastic or noticeably softened, which might injure the rubber, since beneficial reduction in cutting resistance is obtained at lower temperatures. If desired, the sheet, while still hot from vulcanization, may be cut promptly into strip form with satisfactory results or it may be cooled and then reheated in any convenient manner.

It is obvious that the methods of the two embodiments described above may be combined in which case the solvent may be placed in a substantially closed container and heated to an elevated temperature. Thus, the swelling action of the solvent will be accelerated as well as augmented by the action of the heat upon the rubber.

The present invention is especially useful in cutting sheets of latex rubber, which normally is much tougher than masticated rubber and which is especially difficult to cut in a satisfactory manner, but the invention obviously is not limited to treating and cutting latex rubber sheets and may be applied to calendered or other masticated rubber sheets as well. Similarly, it is not essential to the invention hereof that the rubber be completely vulcanized, since unvulcanized or partially vulcanized sheets, or even an incompletely dried latex sheet may be treated in a similar manner, although more care usually is required in handling the necessarily softer unvulcanized strips and it is somewhat more difficult to control the degree of swelling. An advantageous result accrues, however, from cutting swollen or heated unvulcanized sheet with a shear type slitter for in such case, the cut threads are deformed during the cutting operation to produce a rounded thread in a manner similar to that described in my co-pending application Serial No. 693,113 filed October 11, 1933, which now has matured into U. S. Patent No. 2,061,749, granted November 24, 1936.

It is apparent that the swollen or heated rubber may be cut with any suitable device such as a slitter in which a series of sharp circular knives operate against a backing roll which may be grooved, or in which the knives cooperate with similar sharp circular knives to provide a sharp edged rotary shear, or a similar apparatus in which the cutting discs are square faced to provide a true shearing device. Other types of cutting or slitting devices obviously may be used. The cutting members of any of such devices may be heated if desired further to increase their cutting efficiency.

The term "rubber" has been employed in a generic sense to include caoutchouc, balata, gutta percha, synthetic rubber and similar elastic gums or resins and the term "latex" likewise is intended to include all natural or artificial aqueous dispersions of rubber as hereinabove defined either vulcanized or unvulcanized, and whether concentrated, diluted, thickened, thinned, or otherwise preliminarily treated. The latex may contain any desirable compounding ingredients such as vulcanizing agents, age-resisters, fillers, pigments, softeners, etc. commonly used in the rubber industry.

Numerous modifications and variations in the materials, apparatus, and procedure hereinabove described may be made without departing from the scope of the invention as indicated by the appended claims.

I claim:

1. The method which comprises treating rubber with a chemical swelling agent temporarily to swell the rubber and to reduce its resistance to cutting, cutting the swollen rubber into desired form, and restoring the cut rubber to its normal unswollen condition.

2. The method which comprises treating rubber with an organic swelling agent to swell the rubber and to reduce its resistance to cutting, cutting the swollen rubber, and restoring the cut rubber to its normal unswollen condition.

3. The method which comprises preparing a sheet of soft rubber, immersing the sheet in a liquid swelling agent until it is swollen to a substantial extent, cutting the swollen sheet into strip form, and removing swelling agent from the cut strips to restore the rubber thereof to its normal unswollen condition.

4. The method which comprises preparing a sheet of soft rubber, treating the rubber with an organic swelling agent to swell the rubber and to reduce its resistance to cutting, cutting the swollen rubber sheet simultaneously along a plurality of parallel lines to produce a plurality of rubber strips, and removing swelling agent from the cut strips to restore the rubber thereof to its normal unswollen condition.

5. The method which comprises preparing a sheet of unvulcanized rubber composition, vulcanizing the rubber, treating the vulcanized rubber sheet with a liquid swelling agent until the sheet is swollen to a substantial extent, cutting the swollen sheet into strip form, and removing swelling agent from the cut strips to restore the rubber thereof to its normal unswollen condition.

6. The method which comprises preparing a sheet of unvulcanized rubber composition, treating a substantial portion of the unvulcanized rubber sheet with a swelling agent temporarily to weaken it and to reduce its resistance both to cutting and to deformation, thereafter passing the treated portion of the sheet through a rotary multiple disc shear to cut the rubber and to deform the rubber as it is cut to produce rounded rubber strips, and restoring the rubber of the cut strips to its normal physical condition.

7. The method which comprises forming from liquid rubber latex a coherent sheet of soft latex rubber composition having a high resistance to cutting, temporarily weakening the rubber by treatment with a chemical swelling agent to reduce its resistance to cutting, cutting the temporarily weakened rubber into desired form, and restoring the cut rubber to its normal condition.

8. The method which comprises preparing an unvulcanized but vulcanizable rubber composition, at least partially vulcanizing the rubber, swelling the at least partially vulcanized rubber by treatment with a liquid swelling agent, cutting the swollen rubber into desired form, and restoring the cut rubber to its normal unswollen condition.

9. The method which comprises preparing an unvulcanized but vulcanizable rubber composition, vulcanizing the rubber to an optimum soft-vulcanized rubber state, swelling the vulcanized rubber by treatment with a liquid swelling agent, cutting the swollen rubber into desired form, and restoring the cut rubber to its normal unswollen condition.

CARL L. BEAL.